United States Patent [19]

Ishiguro et al.

[11] Patent Number: 4,630,916

[45] Date of Patent: Dec. 23, 1986

[54] CIRCUIT FOR DETECTING CHARGED VOLTAGE OF ELECTRONIC FLASH

[75] Inventors: Minoru Ishiguro, Urawa; Kouji Kaneko, Oomiya; Toru Kondo, Yokohama, all of Japan

[73] Assignees: Fuji Photo Optical Co., Ltd., Oomiya; Kabushiki Kaisha Toshiba, Kawasaki, both of Japan

[21] Appl. No.: 647,400

[22] Filed: Sep. 5, 1984

[30] Foreign Application Priority Data

Sep. 12, 1983 [JP] Japan ................... 58-166760

[51] Int. Cl.$^4$ ............................. G03B 15/05
[52] U.S. Cl. ................. 354/418; 354/127.12
[58] Field of Search ................ 354/418, 127.12

[56] References Cited

U.S. PATENT DOCUMENTS

| | | | |
|---|---|---|---|
| 4,096,492 | 6/1978 | Land et al. | 354/418 |
| 4,126,872 | 11/1978 | Yazaki et al. | 354/33 |
| 4,348,087 | 9/1982 | Ellin et al. | 354/418 |
| 4,354,750 | 10/1982 | Hasegawa et al. | 354/418 |
| 4,464,609 | 8/1984 | Nakamura et al. | 354/418 |
| 4,491,405 | 1/1985 | Tsuruta | 354/418 |
| 4,542,975 | 9/1985 | Ishida et al. | 354/418 |

Primary Examiner—Russell E. Adams
Attorney, Agent, or Firm—Oblon, Fisher, Spivak, McClelland, & Maier

[57] ABSTRACT

A voltage dividing circuit containing a switching element is connected in parallel with a main capacitor of which a highly charged voltage is applied to a flash lamp for flashing. Only when the switching element is turned on does the voltage dividing circuit produce a divided voltage. The divided voltage is compared with a reference voltage. The result of the comparison is used for detecting the charged voltage across the main capacitor.

3 Claims, 7 Drawing Figures

CIRCUIT FOR DETECTING CHARGED VOLTAGE OF ELECTRONIC FLASH

Background of the Invention

The present invention relates to a circuit for detecting a charged voltage across a main capacitor of a electronic flash.

In a general electronic flash for a camera, battery voltage is stepped up to about 300 V by a step-up circuit, and supplied to a main capacitor for charging. The charged voltage is supplied between the electrodes of a xenon flash lamp. Under this condition, the xenon tube is triggered at a shutter release timing to emit light in a flashing manner.

In some modern cameras, a sequential mechanism, controlled by a microcomputer, is built therein to appropriately and automatically execute most of the sequential photographing operations.

In a camera of the type, which includes a electronic flash of the auto charging type and an auto focusing mechanism, when a release button is pushed, the brightness of an object to be photographed is first measured. Then, it is checked, on the basis of the measurement result, whether or not a electronic flash is required for photographing the object.

When the electronic flash is not required, the auto focusing mechanism is driven to obtain an optimum focus for the object. Following the focusing operation, a shutter is operated to photograph the object. After the shutter operation, a film is fed and the shutter is set. Then, the microprocessor starts charging the main capacitor of the electronic flash and stops the charging operation the instant the capacitor is charged to a predetermined voltage.

In other words, when the electronic flash is required, a detecting circuit is driven to check whether or not the charged voltage across the main capacitor reaches the predetermined voltage. If the result of the check is YES, the auto focusing mechanism is operated. When the check result is NO, the capacitor is charged for a predetermined period or up to the predetermined voltage, and then the auto focusing mechanism is driven.

In a typical electronic flash detecting circuit as currently and widely used, a voltage dividing circuit is connected in parallel with a main capacitor. A voltage derived from the voltage dividing circuit is applied to a comparator where it is compared with a reference voltage. The prior detecting circuit, however, is disadvantageous on the following point. Since the main capacitor constantly feeds the current to the voltage dividing circuit, the battery is consumed of its electric power to frequently cause a decrease in the charged voltage across the main capacitor. Particularly, when the voltage of the main capacitor is decreased below a predetermined voltage, the capacitor must supplementarily be charged again after the release operation. This impairs the shutter speed operation.

SUMMARY OF THE INVENTION

Accordingly, an object of the present invention is to provide a electronic flash detecting circuit of charged voltage which can remarkably reduce a discharge current from the main capacitor, thereby saving electric power from the battery.

According to the present invention, there is provided a electronic flash charged-voltage-detecting circuit which requires a minute current for checking whether or not the charged voltage across the main capacitor reaches a predetermined voltage, thereby realizing power saving of the battery.

DETAILED DESCRIPTION OF THE PREFERRED EMBODIMENT

An embodiment of the present invention will be described referring to the accompanying drawings.

Figure 1:
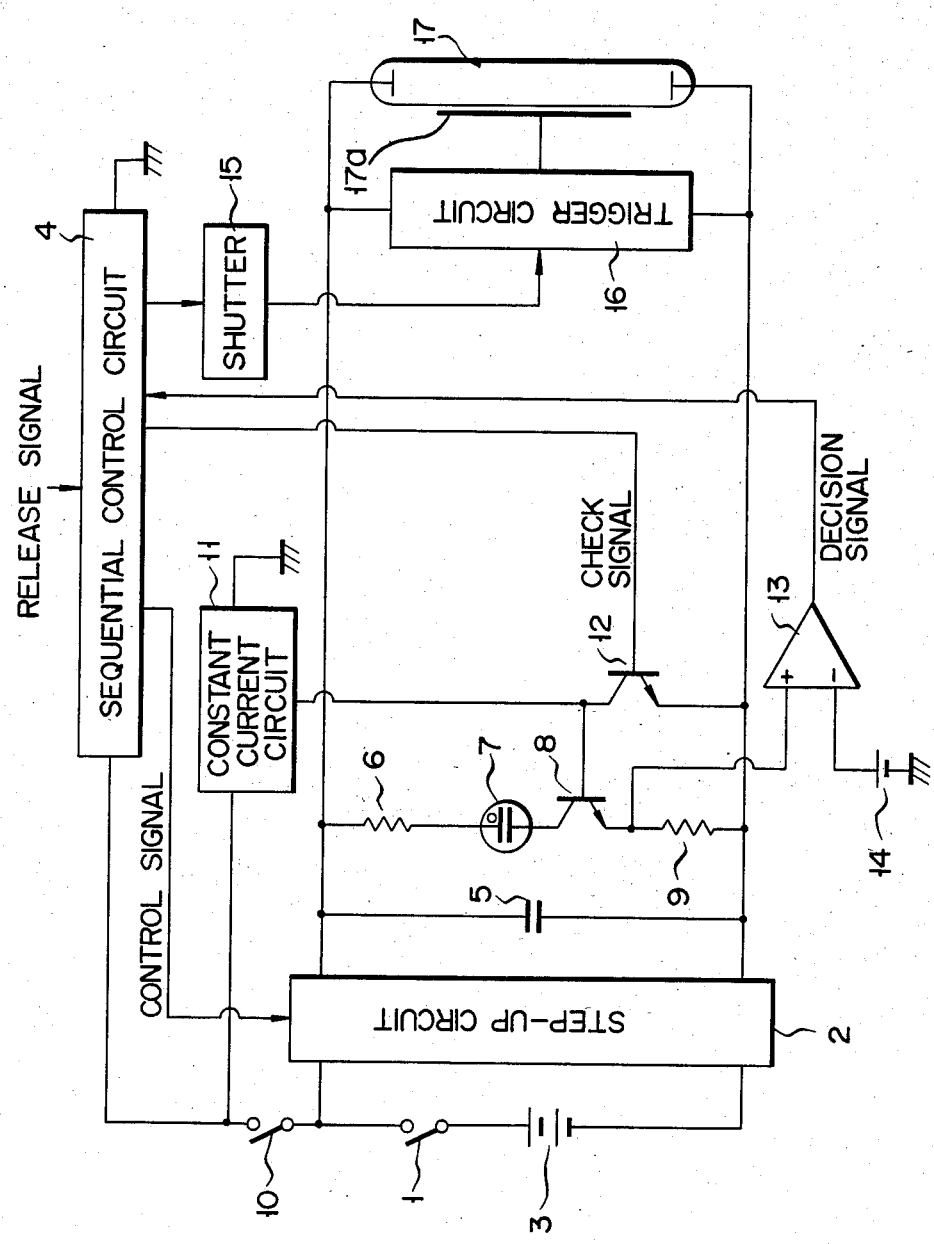
FIG. 1 is a circuit diagram illustrating a electronic flash circuit into which a electronic flash detecting circuit of charged voltage according to the present invention is assembled.

FIG. 1 is a circuit diagram showing a electronic flash circuit which is an embodiment of the present invention. When a lens cover (not shown) of a camera is opened, a power switch 1 is turned on and electric power is supplied from a battery 3 to a step-up circuit 2. The step-up circuit 2 operates when the power switch 1 is in an ON state, and a flash control signal produced from a sequence control circuit 4 is at a low ("L") level. The step-up circuit 2 steps up the voltage of the battery 3 to about 330 V and charges a main capacitor 5 with this stepped up voltage of about 330 V. The step-up circuit 2, having an auto-cut function, stops the charging operation when the main capacitor 5 is charged to 330 V.

A voltage dividing circuit, formed of a series circuit containing a resistor 6, a neon tube 7, a transistor 8 and a resistor 9, is connected across the main capacitor 5. When the transistor 8 is turned on, the main capacitor 5 feeds a current for detecting the charged voltage to the voltage dividing circuit when the transistor 8 is turned on. In the present embodiment, the maximum voltage of the main capacitor 5 is approximately 330 V. The minimum voltage required for keeping an amount of light as specified by a guide number is approximately 270 V.

The neon tube 7 being used starts its discharge to emit light when it is applied with a voltage of about 230 V to 290 V or more. At this time, the discharge current flowing through the neon tube 7 is about 100 $\mu$A. The neon tube 7 with such a performance is well suited for the charged voltage of the main capacitor 5.

When the release button (not shown) is halfway pushed, set-up operation is effected and the subswitch 10 is turned on, permitting electric power from the battery 3 to be supplied to a sequence control circuit 4 made up of a microcomputer and a constant current circuit 11. The output current of the constant current circuit 11 is connected through a collector-emitter path of a transistor 12 to a reference potential. The collector of the transistor 12 is connected to the base of the transistor 8. Normally, both the transistors 8 and 12 are in an OFF state. Upon halfway pushing of the release button, release operation is effected and the transistor 12 is turned on to allow a minute constant current. When the release button is further pushed, a release signal is produced. The release signal produced drives the sequence control circuit 4 to cause it to generate a check signal. The check signal then turns on the transistor 12. Accordingly, a detecting signal flows through the voltage dividing circuit. As a result, a voltage corresponding to the charged voltage across the main capacitor 5 appears at a node between the transistor 8 and the resistor 9. The voltage at the node is then applied to the noninverting input terminal of a comparator 13. The comparator 13 compares this voltage with a reference voltage applied to the inverting input terminal thereof. When the voltage across the main capacitor 5 is above the minimum voltage, the comparator 13 produces a decision signal at the high ("H") level. The "H" signal indicates that the electronic flash is ready for light emission and is sent to the sequence control circuit 4.

The sequence control circuit 4 reads the state of the decision signal from the comparator 13 at the leading edge of the check signal. When detecting that the electronic flash is ready for light emission, the sequence control circuit 4 executes the next step, for example, it operates the shutter 15 to start the film exposure. In synchronism with the operation of the shutter, a trigger circuit 16 is driven to generate a high voltage for application to a trigger electrode 17a of a flash lamp 17. The flash lamp 17 under the influence of the charged voltage across the main capacitor 5, when triggered by the high voltage, instantaneously discharges to flash and illuminate an object with the flashed light.

The sequence control circuit 4 executes a predetermined sequence of procedural steps for photographing when the release button is fully pushed. The photographing operation may be realized by programming such a photographing procedure into a microprogram and executing the program by a microprocessor. In the camera with an auto focusing mechanism built therein, after the electronic flash charged voltage is checked, the auto focusing mechanism is driven to automatically obtain an optimum focus, and then the shutter 15 is driven.

Figure 2:
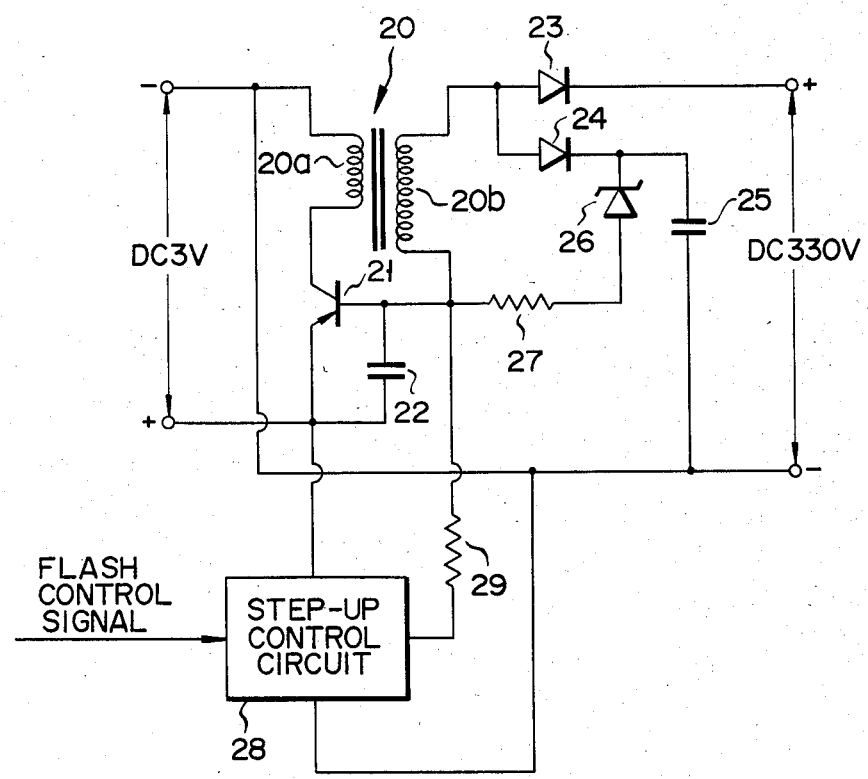
FIG. 2 is a circuit diagram of an exemplar step-up circuit.

Turning now to FIG. 2, there is shown an example of the step-up circuit 2. As shown, the primary winding 20a of a transformer 20 is connected in series to a transistor 21. A capacitor 22 is connected between the base and the emitter of the transistor 21. The output voltage of the secondary winding 20b of the transformer 20 is rectified, by a diode 23, into a DC high voltage DC 330 V, which in turn is applied to the main capacitor 5 for its charging. At the same time, the voltage of the secondary coil 20b is applied through a diode 24 to a capacitor 25. The capacitor 25 is charged with the voltage applied. A capacity of the capacitor 25 is smaller than that of the main capacitor 5. When the charged voltage across the main capacitor 5 reaches a predetermined maximum voltage, a Zener diode 26 is conductive to allow current to flow through a resistor 27. The current flow places the base of the transistor 21 at an "H" level. Then, the transistor 21 is turned off to stop oscillation of the step-up circuit 2.

A step-up control circuit 28 produces an "L" signal for a fixed period of time only when a control signal is in an "L" level. The "L" signal is applied to the base of the transistor 21 via a resistor 29. Upon receipt of the "L" signal, the transistor 21 is turned on to start oscillation of the step-up circuit 2. The control signal takes the "L" level when the main capacitor 5 is recharged and the photographing is completed.

Until the sequence control circuit 4 receives a release signal, it is in a nonoperating state, and hence the control signal is kept in the "L" level. When it is placed in an operating state by the release signal applied, the control signal is rendered "H" in level. When the decision signal of the comparator 13 is "H", the control signal is kept to the "H" level till the photographing is completed. When the decision signal is "L" in level, a recharge to the main capacitor 5 is required. To satisfy the requirement, the control signal is rendered "L" in level to oscillate the step-up circuit 2 and to charge the main capacitor 5 up to the minimum voltage.

Figure 3:
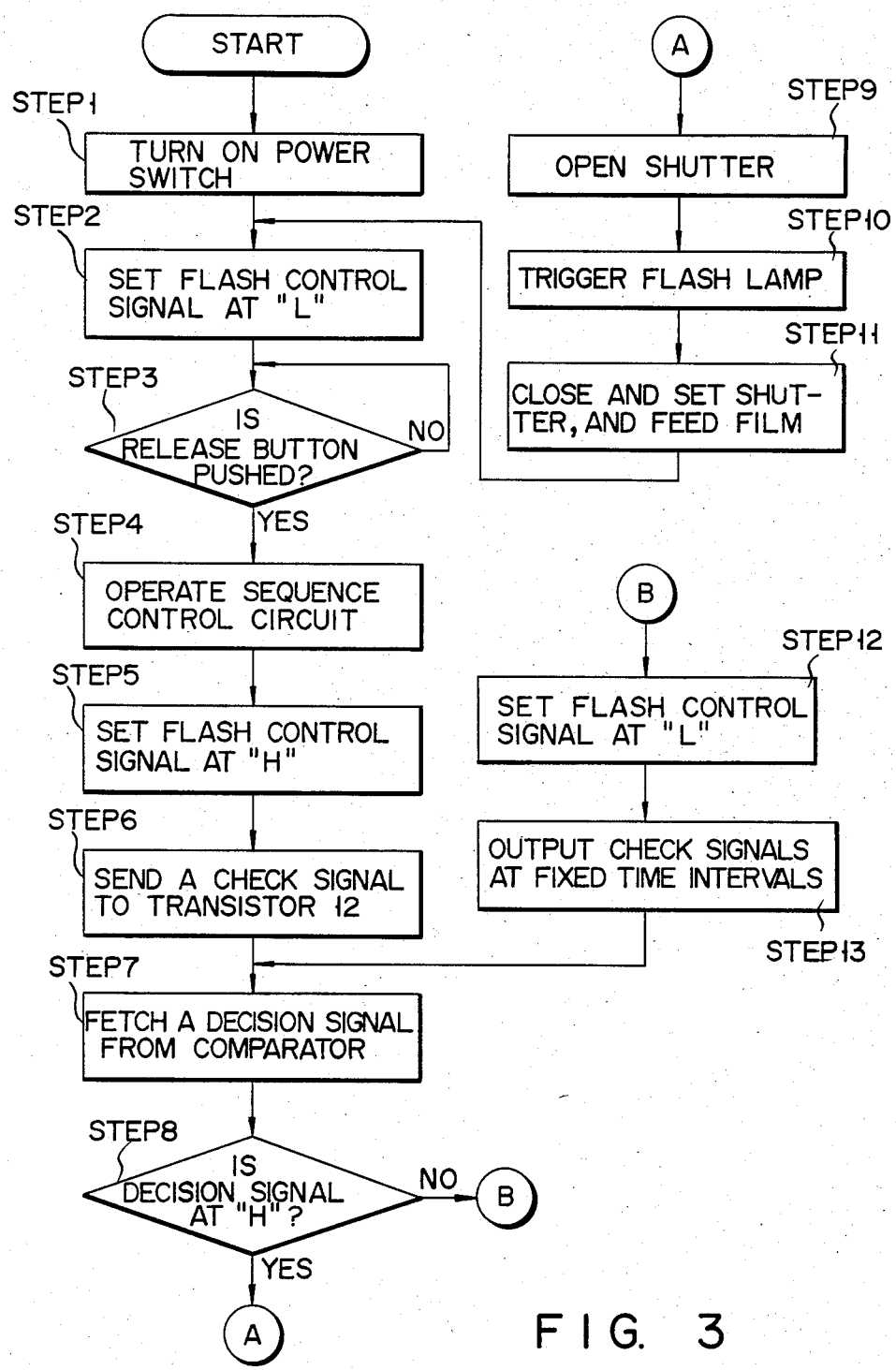
FIG. 3 is a flowchart showing a sequence of operations of a sequence control circuit used in the circuit of FIG. 1.

FIG. 3 flowcharts the operation sequence of the sequence control circuit 4. To start, the lens cover is opened, and the power switch 1 is turned on in STEP 1 in a sequence of photographing procedural steps as programmed and executed by the sequence control circuit 4, more exactly a microprocessor of the sequence control circuit 4. Next, in STEP 2, the control signal is set to the "L" level. Accordingly, the step-up circuit 2 is operated to start charging the main capacitor 5. Thus, when the power switch 1 is turned on, the sequence control circuit 4 renders the control signal "L" in level to set up a charge mode in the electronic flash circuit. Under this condition, the transistor 21 is forwardly biased to start the oscillation of the step-up circuit 2. A high voltage generated by the secondary winding 20b of the transformer 20 is rectified by the diodes 23 and 24 and charges the main capacitor 5 and the capacitor 25. As recalled, when the main capacitor 5 is charged to the maximum voltage by the step-up circuit 2, the Zener diode 26 is conductive to allow current to flow through the resistor 27 to reversely bias the transistor 21. Then, the transistor 21 is nonconductive.

Next, in STEP 3, it is checked to see whether or not the release button is pushed. If it is not pushed, the checking operation of STEP 3 is repeated till it is done. If the result of the checking is YES, STEP 4 is executed to start the sequence control by the sequence control circuit 4.

Figure 4:
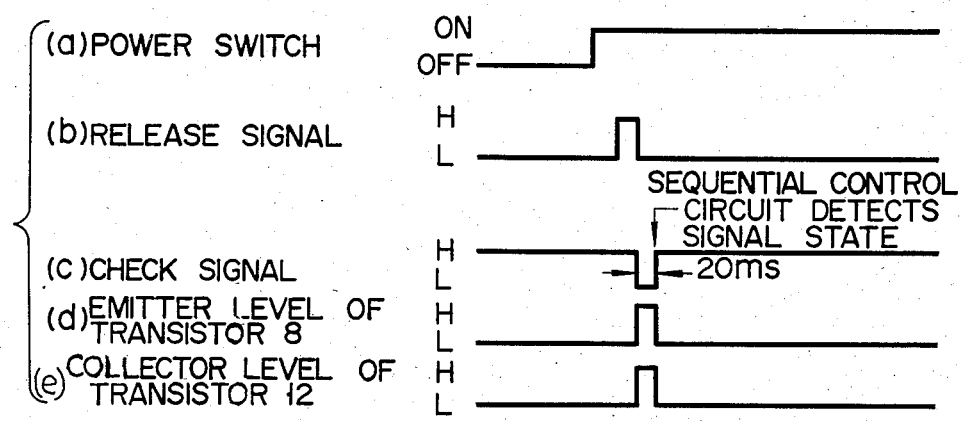
FIGS. 4 and 5 respectively show timing charts useful in explaining the two operations for checking a charged voltage of the electronic flash in two modes, in which the FIG. 4 chart is for requiring no recharge to a main capacitor, and the FIG. 5 chart is for requiring recharge to the capacitor.

More specifically, when the release button is halfway pushed, the subswitch 10 is turned on to feed currrent to the battery 3 and the constant current circuit 11. Further pushing of the release button causes a release signal. By the release signal, the sequence control circuit 4 starts the sequential control. In STEP 5, the control signal is set to the "H" level. If the charging to the main capacitor 5 is being performed, the charging operation is temporarily stopped. Subsequently, in STEP 6, a check signal is applied to the transistor 12. In this step, the transistor 12 is turned off and the transistor 8 is turned on. Upon turning on the transistor 8, a minute detecting current flows into the voltage dividing circuit, thereby to set up a voltage at the node between the transistor 8 and the resistor 9. This voltage is compared with the reference voltage by the comparator 13. When the charged voltage across the main capacitor 5 is above the minimum voltage, the comparator 13 produces a decision signal of "H" level at the leading edge of an "H" pulse of the emitter voltage of the transistor 8 (see FIG. 4). In subsequent STEP 7, the sequence control circuit 4 fetches a decision signal from the comparator 13. In STEP 8, a logical state of the decision signal is checked. In this case, the result of the check is YES. Accordingly, STEP 9 is executed to open the shutter and to start the film exposure. Then, the trigger circuit 16 is operated to trigger the flash lamp 17 which in turn flashes. This is done in STEP 10. Succeedingly, in STEP 11, the shutter 15 is closed and a motor (not shown) is driven to set the shutter 15 and feed the film. The control by the sequence control circuit 4 returns to STEP 2. STEP 3 is executed to set the control signal of "L" level and to charge the main capacitor 5 up to the maximum voltage.

Figure 5:
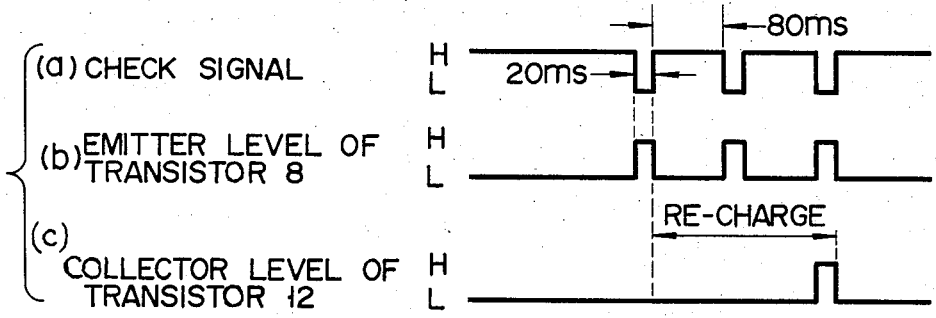

Returning to STEP 8, if the result of the check is NO, viz., if the charged voltage across the main capacitor 5 is lower than the minimum voltage, the microprocessor of the sequence control circuit 4 jumps in the program execution from STEP 8 to STEP 12. In this step, the control signal is set to the "L" level. Accordingly, the step-up circuit 2 is operated to charge the main capacitor 5. During the charging period, the check signal is rendered "L" in level every 100 ms. The charging state of the main capacitor 5 is repeatedly checked as the check signal goes positive. For this operation, reference is made to FIG. 5, and STEP 13 is provided. After completion of this step, the microprocessor returns to STEP 7. Then, if the voltage across the main capacitor 5 is above the minimum voltage, the result of the check in STEP 8 is YES, and STEPs 9 through 11 are successively executed to make the photographing operation, as described above.

The flowchart shown in FIG. 3 is prepared for the electronic flash drive circuit of the type in which the flash lamp 17 flashes every time a photograph is made. Alternatively, the brightness of an object is measured before photographing, and it is checked, on the basis of the measured result, whether or not the electronic flash is needed for photographing the object. Specifically, if the brightness is unsatisfactorily low, after the charged voltage across the main capacitor 5 is checked, the shutter is operated to cause the flash lamp to flash. If the brightness is satisfactorily high, the shutter is operated without checking the charged voltage.

While in the above flow chart the check signal is rendered "L" at fixed intervals, it may be kept in "L" till the output of the comparator 13 becomes "H" in level.

Figure 6:
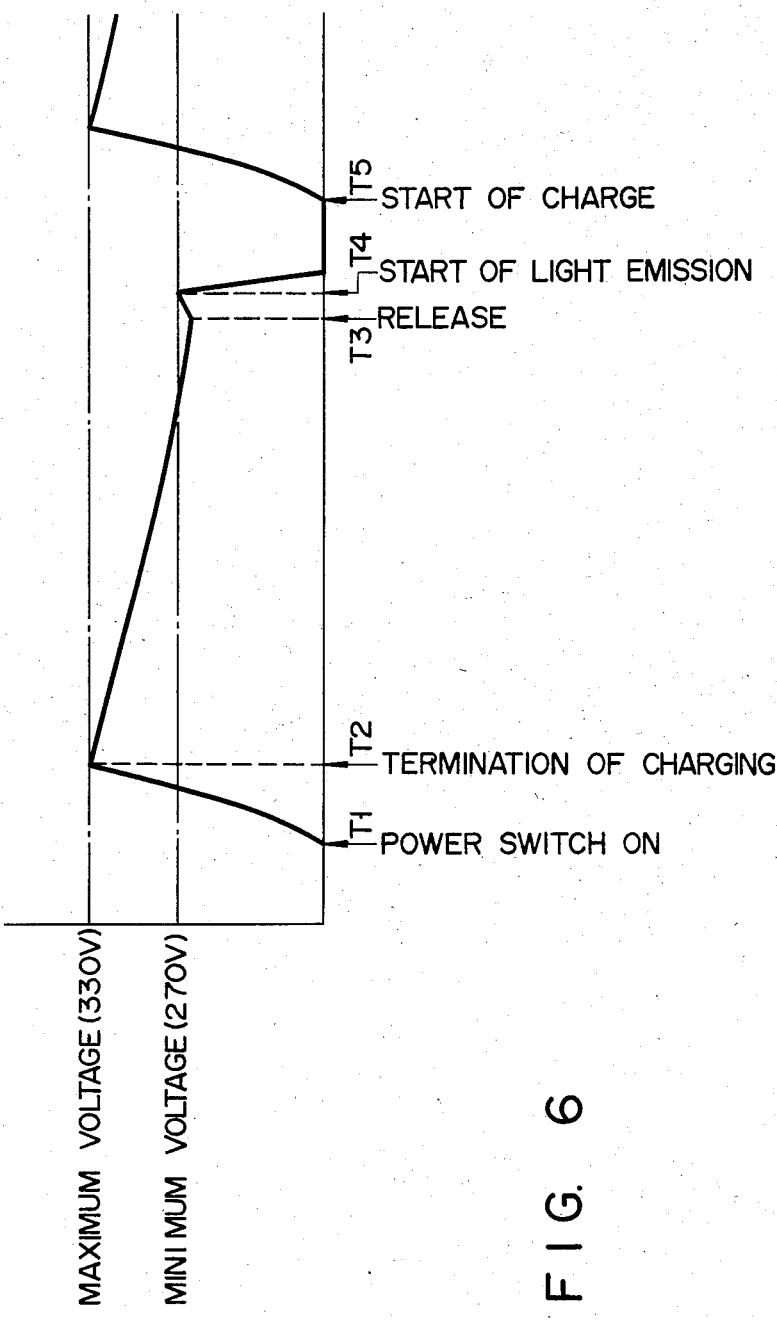
FIG. 6 illustrates how a charged voltage across the main capacitor varies.

In FIG. 6, there is depicted a variation of the charged voltage across the main capacitor 5. At time T1, the power switch 1 is turned on. Then, the step-up circuit 2 operates to gradually increase the charged voltage across the main capacitor 5. At time T2, the charged voltage reaches the maximum voltage. Also at this time, the charging operation to the main capacitor 5 is stopped. The charged voltage across the main capacitor 5 gradually decreases because of its leak current. When the release button is pushed at T3, for example, the charged voltage across the main capacitor 5 is checked. If the charged voltage is below the minimum voltage, the step-up circuit 2 is operated again to recharge the main capacitor 5. Then, the charged voltage reaches the minimum voltage at time T4, and simultaneously the shutter 15 is operated and the flash lamp 17 emits light in a flashing manner. Following the completion of the photographing, at time T5 a signal from the sequence control circuit 4 drives the step-up circuit 2 to charge the main capacitor 5 again.

Figure 7:
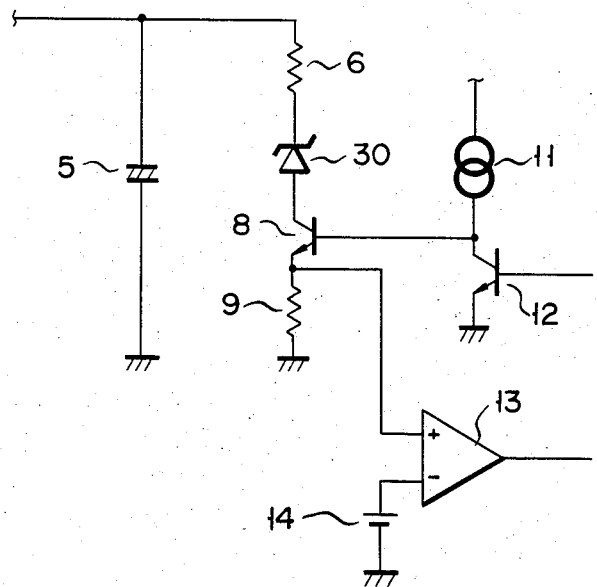
FIG. 7 is a circuit diagram of a key portion of another embodiment of a electronic flash detecting circuit of charged voltage according to the present invention.

Turning now to FIG. 7, there is shown another embodiment of the present invention. In the figure, a key portion of the embodiment is illustrated, using like reference numerals for like portions in FIG. 1. In this embodiment, a Zener diode 30 is used in place of the neon tube 7 in FIG. 1. In operation, when the charged voltage across the main capacitor 5 is above the minimum voltage, the transistor 8 is turned on, and the Zener diode 30 is conductive. Then, a voltage corresponding to the charged voltage across the main capacitor 5 appears at the node between the transistor 8 and the resistor 9.

As seen from the foregoing description, in the present invention, the transistor 12 is turned off and the transistor 8 is turned on only when the charged voltage across the main capacitor 5 is checked, thereby to allow the detecting current to flow through the voltage dividing circuit. Therefore, the discharging current from the main capacitor 5 is lessened, thereby to save the electric power of the battery.

What is claimed is:

1. A circuit for detecting charged voltage of electronic flash comprising:
   means for stepping up a voltage of a battery;
   means for storing charges under a high voltage from said step-up means;
   means for flashing in response to a trigger signal applied, with a charged voltage across said storing means applied between electrodes of said flashing means;
   voltage dividing means having a switching means inserted therein in a series fashion, said voltaging dividing means providing a voltage corresponding to the charged voltage across said storing means;
   means for comparing a voltage from said voltage dividing means with a reference voltage; and
   a sequence control circuit, operating such that said sequence control circuit operates in response to a release signal produced when a release button is operated, applies a check signal to said switching means in said voltage dividing circuit, thereby to render said switching means conductive, and fetches the result of the comparison from said comparing means to check whether a recharge to said storing means is needed or not.

2. A circuit for detecting charged voltage of electronic flash according to claim 1, in which said voltage dividing circuit is a series circuit including a resistor, a neon tube, a switching element, and a resistor.

3. A circuit for detecting charged voltage of electronic flash according to claim 1, in which said voltage dividing circuit is a series circuit including a resistor, a Zener diode, a switching element, and a resistor.

* * * * *